(12) United States Patent
Davis

(10) Patent No.: US 10,604,170 B1
(45) Date of Patent: Mar. 31, 2020

(54) SAFETY FOLDING CART

(71) Applicant: Raymond E Davis, Heath, TX (US)

(72) Inventor: Raymond E Davis, Heath, TX (US)

(*) Notice: Subject to any disclaimer, the term of this patent is extended or adjusted under 35 U.S.C. 154(b) by 0 days.

(21) Appl. No.: 16/517,651

(22) Filed: Jul. 21, 2019

(51) Int. Cl.
   *B62B 3/02* (2006.01)
   *B62B 3/00* (2006.01)

(52) U.S. Cl.
   CPC ............... *B62B 3/02* (2013.01); *B62B 3/008* (2013.01)

(58) Field of Classification Search
   CPC ........... B62B 3/001; B62B 3/007; B62B 3/02; B62B 2205/06; B62B 2205/26
   See application file for complete search history.

(56) References Cited

U.S. PATENT DOCUMENTS

| | | | | |
|---|---|---|---|---|
| 3,476,061 A | * | 11/1969 | Takahashi | A47B 3/087 108/169 |
| 4,740,010 A | * | 4/1988 | Moskovitz | A47B 31/04 108/170 |
| 5,915,723 A | * | 6/1999 | Austin | B62B 3/02 280/43 |
| 8,388,015 B2 | * | 3/2013 | Chen | B62B 3/007 280/642 |
| 8,973,940 B2 | * | 3/2015 | Chen | B62B 3/02 280/35 |
| 9,327,749 B2 | * | 5/2016 | Young | B62B 7/008 |
| 9,474,368 B2 | * | 10/2016 | Frankel | A47B 43/00 |
| 9,896,118 B2 | * | 2/2018 | Choi | B62B 3/007 |
| 9,925,999 B2 | * | 3/2018 | Young | B62B 5/0053 |
| 9,956,981 B1 | * | 5/2018 | Fitzwater | B62B 3/007 |
| 9,969,227 B1 | * | 5/2018 | McNeave | B60F 3/0069 |
| 10,081,380 B2 | * | 9/2018 | Fitzwater | B62B 3/022 |
| 10,435,055 B1 | * | 10/2019 | Zhu | B62B 3/025 |
| 10,464,588 B1 | * | 11/2019 | Lin | B62B 9/26 |
| 2008/0073880 A1 | * | 3/2008 | Bess | B62B 3/02 280/651 |

* cited by examiner

*Primary Examiner* — Bryan A Evans
(74) *Attorney, Agent, or Firm* — Baker Law Firm

(57) ABSTRACT

A collapsible cart includes at least one platform and rolling casters. The platform includes pivotable panels that medially break enabling the cart to collapse for storage purposes. Adjacent pivotable panels are connected via pivotable plates. The pivotable plates are connected to struts that are connected to a sliding member configured to be lockable in a fixed position or slide along a medial support member bridging the one or more platforms. The struts are connected to a middle support member that terminates in a middle caster on each side of the collapsible cart.

5 Claims, 12 Drawing Sheets

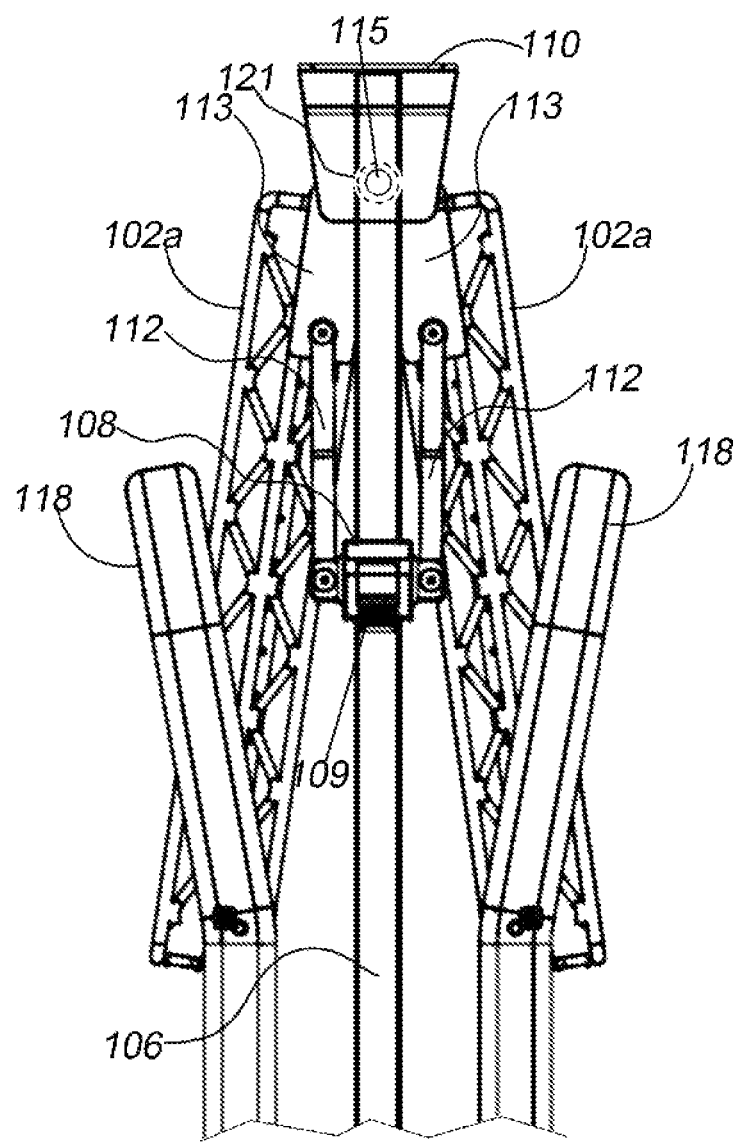

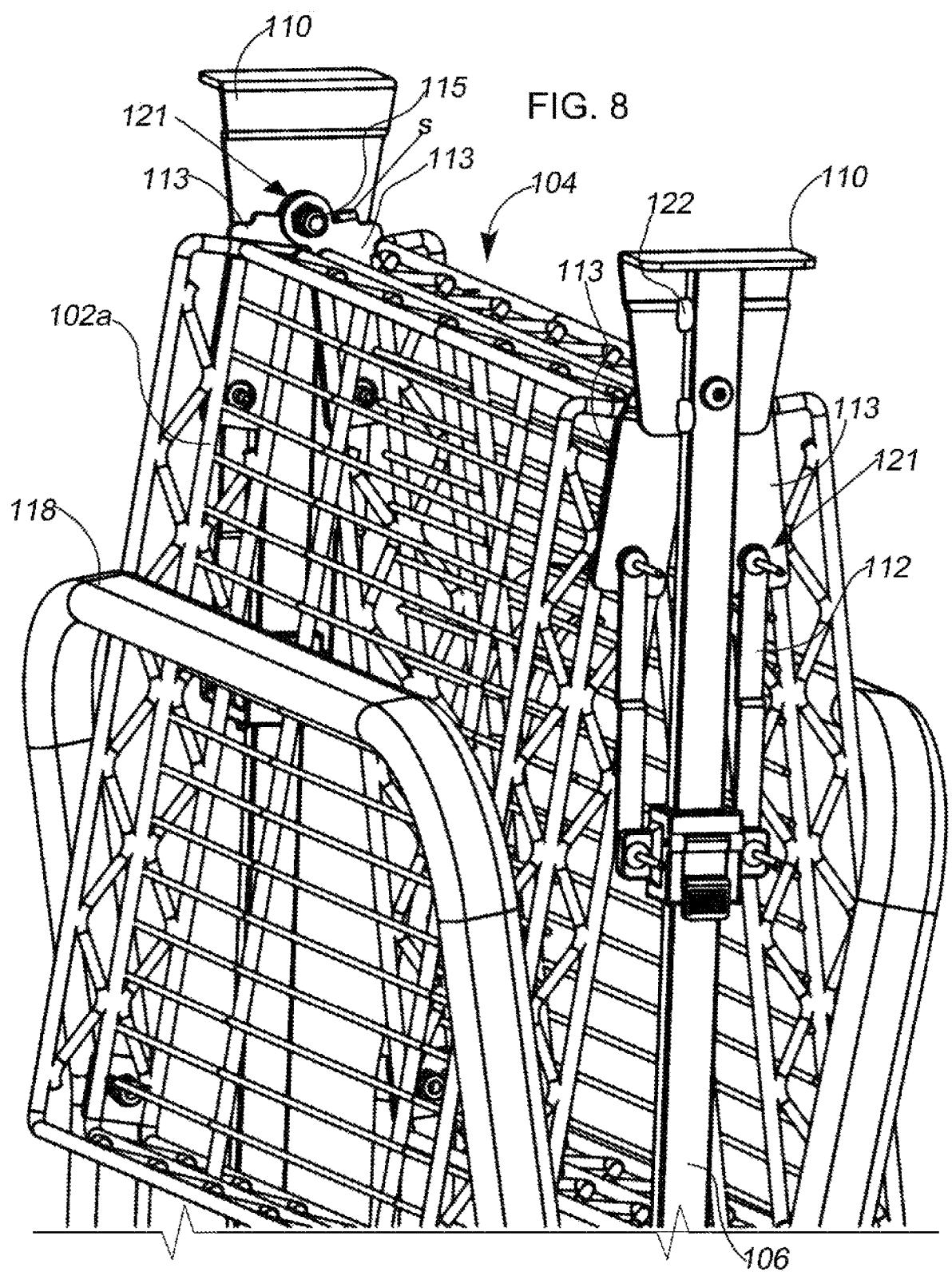

SAFETY FOLDING CART

FIELD OF THE INVENTION

This invention relates to supports and more specifically to carts typically used to transport packages.

BACKGROUND OF THE INVENTION

Transport carts used to transport packages and goods are long known in the art. Typically, past transport carts include one or more platforms, a set of caster wheels and a handle. One ongoing problem is that transport carts tend to waste space when not in use. Some patents attempt to solve the problem of storage by introducing a folding construction wherein one or more platforms are configured to hingeably "break" in the middle when the cart is collapsed. One problem with past folding carts is that when the platforms are brought into a substantially planar disposition, mating or facing portions are prone to catching on loose clothing and the like and may even trap and injure the fingers. Another problem is that transported items may easily fall off of the platform. Past folding carts are unstable and may wobble from side to side.

What is needed is a folding cart configured to be absent mating surfaces that may trap body parts.

It would be desirable if the foregoing folding cart were to include at least one pair of adjacent platforms that are configured to transition from a collapsed state to a substantially planar state, the pair forming a support surface.

It would be desirable if the foregoing folding cart were to include a pair of plate spacers that offer support to adjacent edges of a platform pair.

It would be especially desirable if the foregoing plate spacers were connected by a medial pivot member.

It would be desirable if the foregoing folding cart were to include a pair of handholds disposed superiorly relative to the plate spacers.

It would be particularly desirable if the folding cart were stable and easily manueverable.

It would be desirable to provide a folding cart that occupies much less space than past carts.

SUMMARY OF THE INVENTION

A general example implementation according to the present invention includes a foldable cart comprising at least one medially breaking platform including at least two panels configured to transition from a substantially planar disposition to a collapsed disposition. The cart includes a frame supportive of the at least one medially breaking platform and a set of wheels which may be of the caster type. The frame of the foldable cart includes at least two pair of pivotably joined plates, each plate of each pair of plates is connected to a panel of the at least two panels and pivotably connected to a vertical guide member disposed at sides of the cart. Each vertical guide member is connected to a fifth and sixth caster respectively, that is engaged with the ground when the folding cart is unfolded and in a ready state to support items placed thereon. While in past folding carts, adjacent portions of the upper and lower plate pairs function to reinforce the entire structure when the cart is unfolded. In the present invention, because spaces are created between the edges of the top plate pair and optionally, the bottom plate pair as a safety feature to avoid involvement of a user's fingers, support is augmented by the fifth and sixth caster wheel.

In an aspect combinable with the general implementation, friction washers (e.g., wave washers, conic washers) are employed between adjacent pivoting members of the cart in order to slow transition from a folded/collapsed state to an uncollapsed state. Because of the installation of the friction washers at the pivot points, greater pivot point friction is achieved which has the result of preventing the cart from slamming in in the open or closed position mitigating injuries and more gracefully controlling descent. When the cart is in the open position and moved from place to place, the friction washers expand creating greater pressure force at the pivot points which in turn stabilizes the cart and reduces wobbling. The friction washers function as a slip agent reducing wear between the metal pivot points during rotation but still allows sufficient pivot point grip stabilizing the overall cart.

In an aspect combinable with any other aspect, pivotably joined plates include abutting portions that limit the maximum collapsed position and the maximum planar position.

In an aspect combinable with any other aspect, each pivotable plate is connected to a first end of a strut and a second end of the strut is attached to a slidable member.

In an aspect combinable with any other aspect, the foregoing slidable member is attached to a middle support member which may be a vertical post.

In an aspect combinable with any other aspect, the foregoing slidable member is movable vertically along the middle support member when the cart is collapsed.

In an aspect combinable with any other aspect, the foregoing slidable member is lockable in position on the middle support member.

In an aspect combinable with any other aspect, an upper support surface and a lower support surface of the cart are each comprised of a pair of pivotable panels with a transverse gap between adjacent portions of the panels when each pair of panels is in a planar disposition.

In an aspect combinable with any other aspect, one or more of the support surfaces of the cart include a raised upper surround.

In an aspect combinable with any other aspect, one or more of the support surfaces of the cart include a lower lip surround.

In an aspect combinable with any other aspect, each pair of adjoined pivotable plates are joined by a medial pin.

Other advantages of the present invention will become apparent from the following descriptions, taken in connection with the accompanying drawings wherein by way of illustration and example, preferred embodiments of the present invention are disclosed.

BRIEF DESCRIPTION OF THE DRAWINGS

FIG. 7C is a partial side elevation showing an upper section of a collapsible cart in a collapsed state according to the present invention;

FIG. 8 is an enlarged partial perspective view showing an upper section of the collapsible cart;

DETAILED DESCRIPTION OF THE INVENTION

Figure 1:
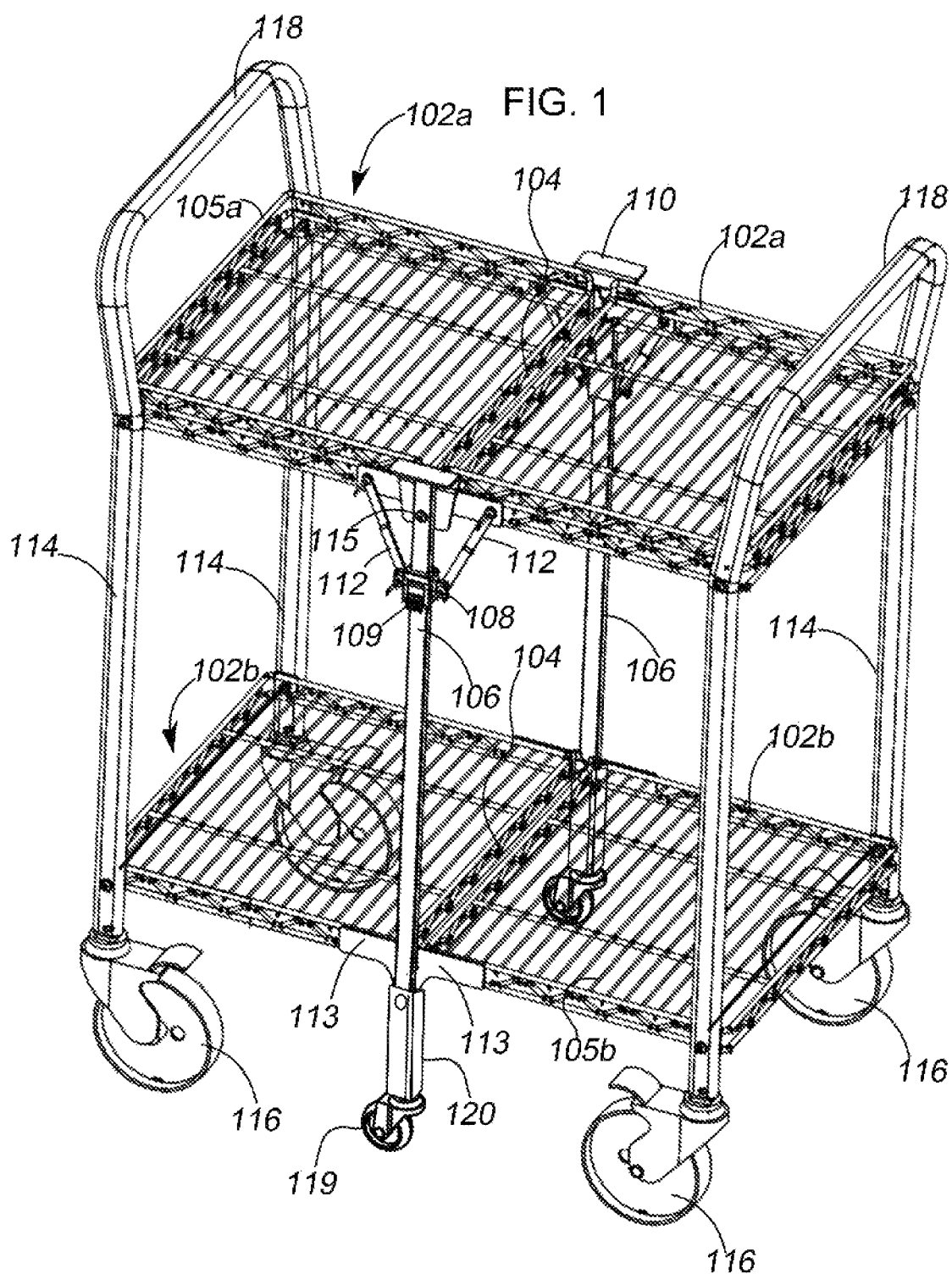
FIG. 1 is a perspective view of an example implementation of a collapsible cart according to the present invention.

Reference Listing 100 cart
102a, 102b top support surface, bottom support surface
103 raised border
104 platform gap
105a, 105b top and bottom pivotable panels
106 middle support member
108 slidable member
109 latch
110 lift flange
112 strut
113a, 113b upper and lower pivot plates
114 frame member
115 pin
116 wheel
118 handle
119 fifth and sixth caster wheels
120 caster wheel support
121 friction washer
122 weld

Definitions

The term "medial" means substantially "halfway between." The term "middle" as used herein simply means "between" two other structures. Unless otherwise explained, any technical terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting. Portions and features of some e implementations may be included in, or substituted for, those of other implementations. Implementations set forth in the claims encompass all available equivalents of those claims.

Referring generally to FIGS. 1-11B, a collapsible cart (100) includes an upper and lower support surface (102a, 102b), the upper and lower support surfaces are connected by support posts (114) at corners of the upper and lower support surfaces. The upper support surface and the lower support surfaces are respectively each comprised of a pair of pivotable panels (105a, 105b), that may be pivoted to move from a planar position where the support surfaces are substantially flat and supportive of articles for transport, to a collapsed disposition where the support surfaces are in a v-configuration. Each pivotable panel (105a, 105b) is connected to a pivotable plate (113) on two corners of the panel. Each pivotable plate (113) partially overlaps another pivotable plate (113) on an adjacent pivotable panel. The partially overlapping plates are joined via a medial pin (115), shaft or post to allow each plate to pivot relative to the adjacent overlapping plate. The pin, shaft or post is connected to a middle support member (106) which may include a vertical post connected at each end to the top and bottom panel pairs respectively. Each middle support member is connected to a caster support (120) and caster (119). Cart (100) includes a pair of struts (112) on each side of the cart. The struts (112) of each pair of struts include a first end pivotably connected a non-overlapping end of a plate (113) with the second opposite end of the strut pivotably connected to a slidable member (108) so that when the pivotable plates pivot, the struts push or pull the slidable member (108) along the middle support member (106). The slidable member may be locked in position on the middle support member by a cam thumb latch (109) that bears against the middle support member when pivoted, or other suitable locking mechanism that will be appreciated by those having skill in the art and access to this disclosure. Instead of closely mating edges, the pivotable panels of each support surface are offset at least ⅝ inch forming a gap (104) therebetween that will not pinch the fingers or entrap portions of supported articles. Wave washers may be placed between pivoting parts in order to slow the pivoting motion; e.g., slow the transition from collapsed to uncollapsed state.

Figure 2:
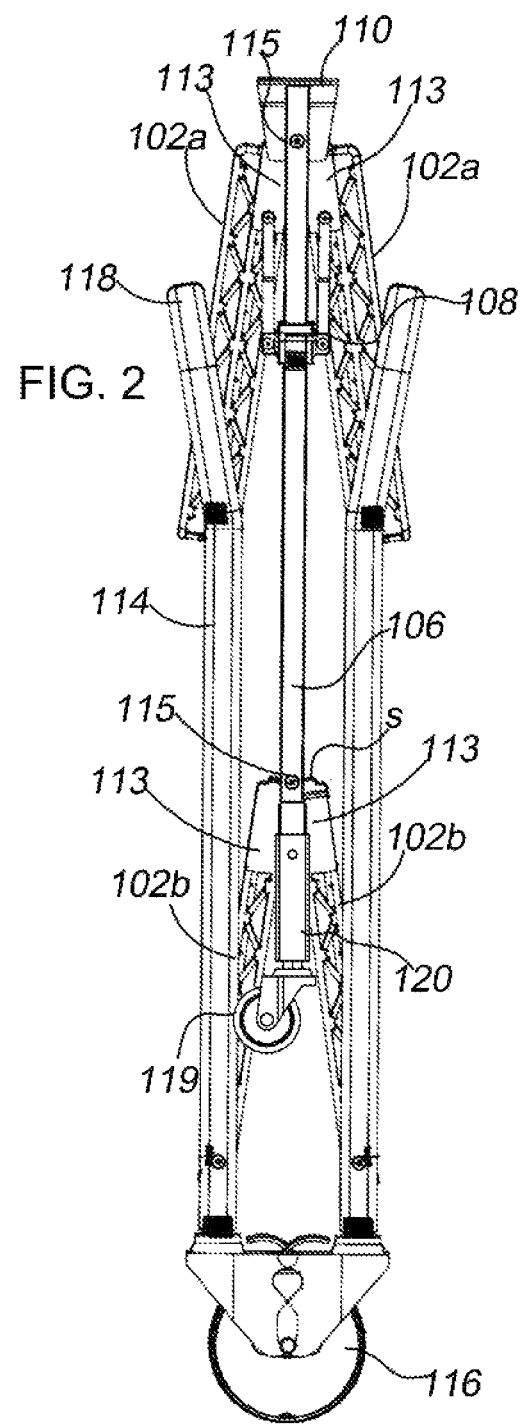
FIG. 2 is a perspective view of the implementation shown in (FIG. 1) in a collapsed state.

FIGS. 1 and 2 show an example implementation of a cart in respectively, a uncollapsed state and a collapsed state. The cart includes upper and lower support surfaces (102a, 102b). An upright post (114) at each corner of the support surfaces forms an upper handle (118) and terminates in a corner caster wheel (116). The cart includes a middle support member (106) on each side of the cart which forms a connection to the pivot plates (113) and a support for casters (119) While the implementation shown has 2 support surfaces, the described construction may include one or more support surfaces—for example, by omitting either the top or bottom panels. While some implementations include a lip (103) around either the top panel pair or the bottom panel pair, in other implementations the lip may be absent.

Figure 3:
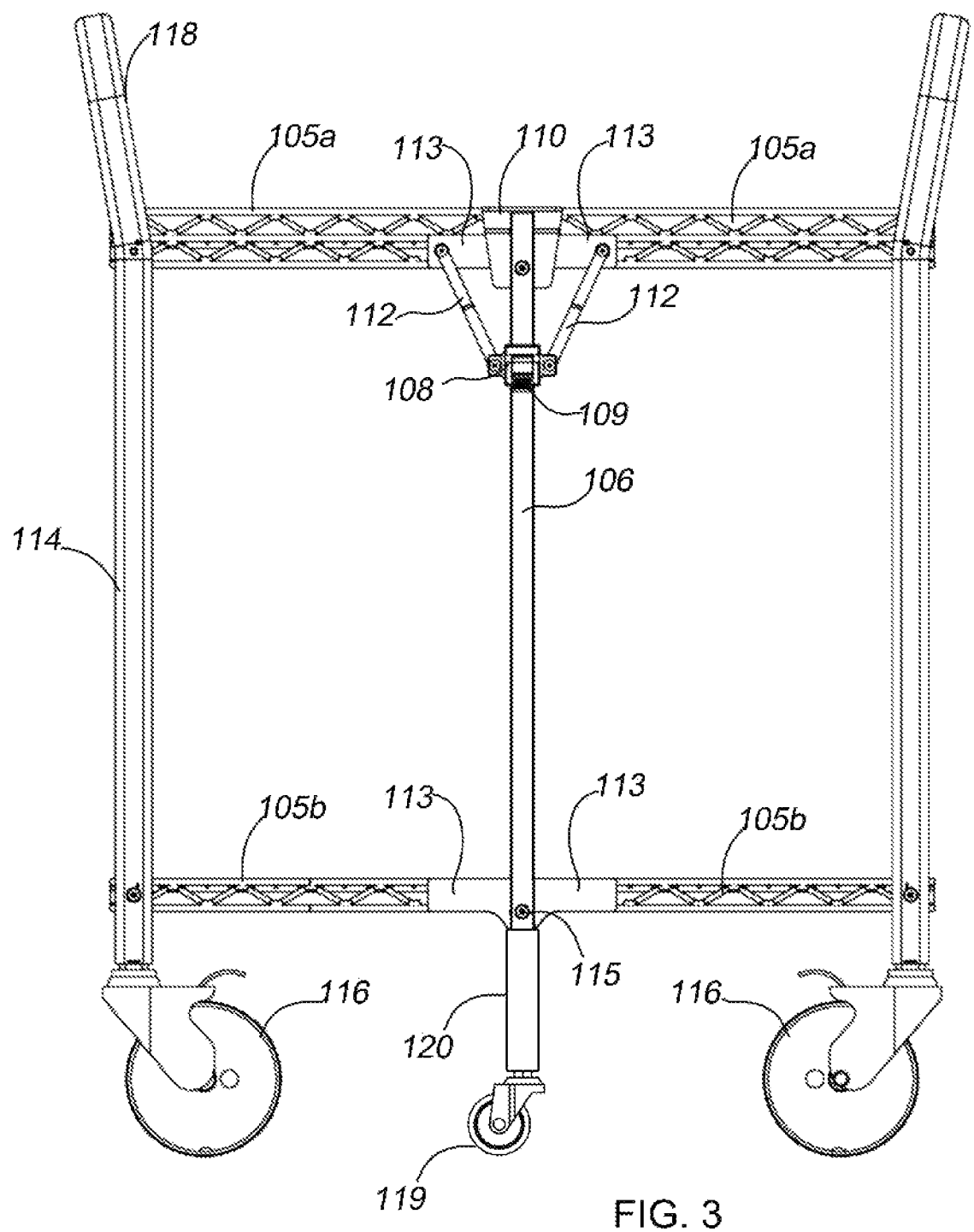
FIG. 3 is a side view of the implementation shown in (FIG. 1)
Figure 4:
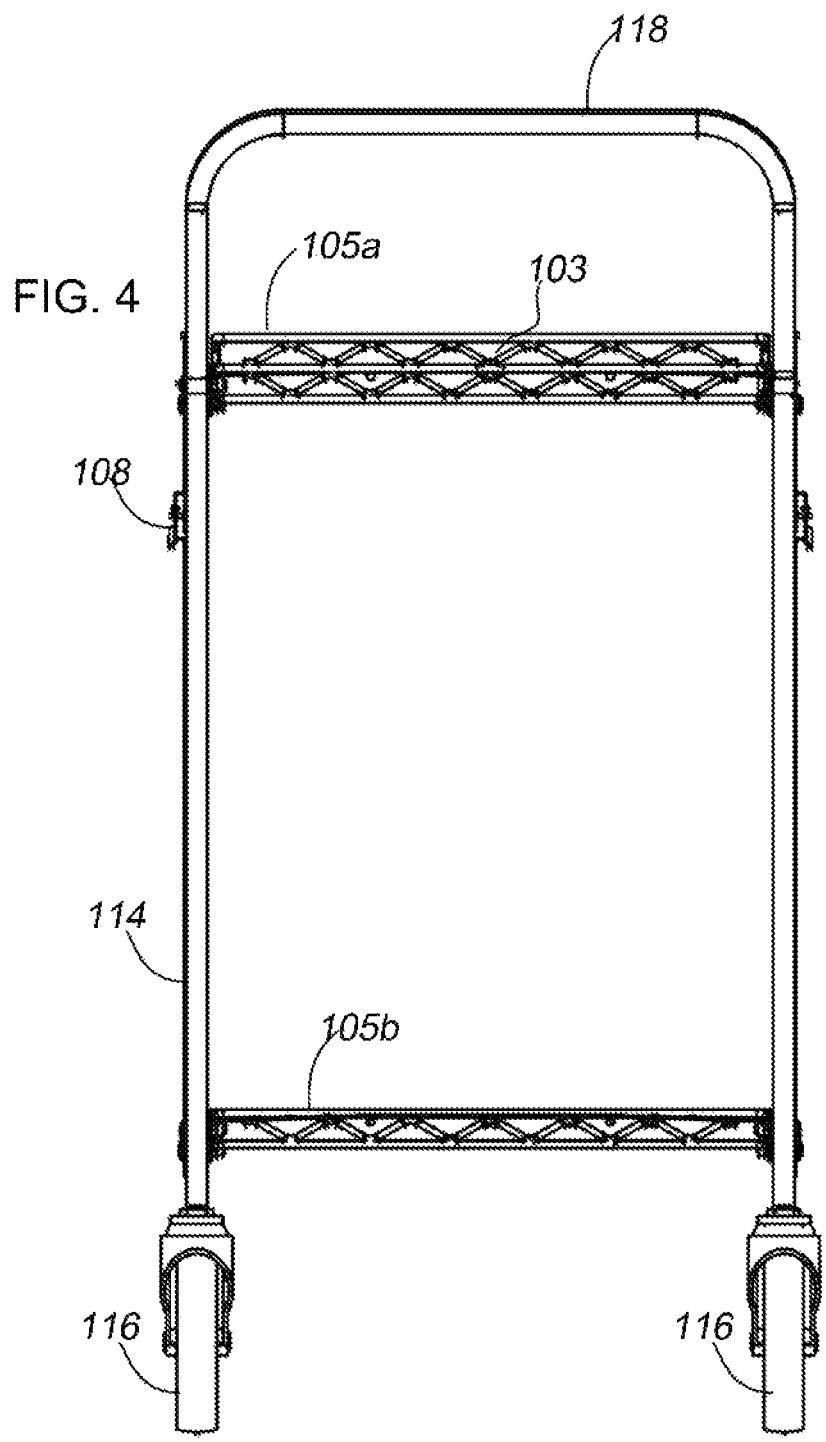
FIG. 4 is an end view of the implementation shown in (FIG. 1)
Figure 5:
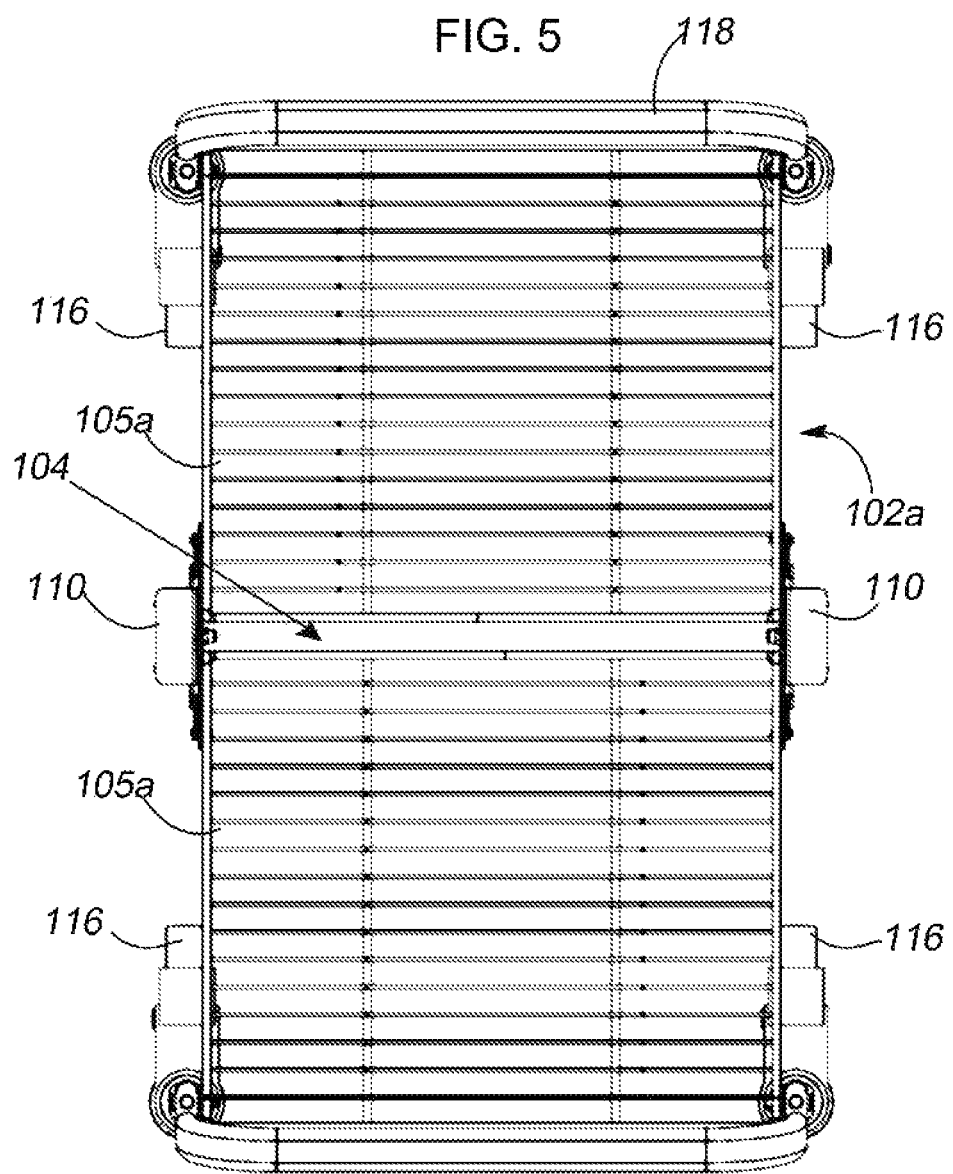
FIG. 5 is a top view of the implementation shown in (FIG. 1)

FIGS. 3 and 4 are side elevations showing a first side and a second side of the collapsible cart. FIG. 5 shows a top view of the cart and clearly shows platform gap (104). In order to collapse the cart, slidable member (108) must be unlocked; typically by pivoting thumb latch (109) down or up, which frees slidable member to move vertically along middle support member (106). Next, lift flanges (110) may be raised which causes directly adjacent sides of the pivotable panels to pivot up and outer sides to pivot downwardly as shown in (FIG. 2). Pivoting thumb latch (109) will cause the slidable member to maintain a fixed position on the middle support member and maintain the cart in the collapsed position.

Figure 6:
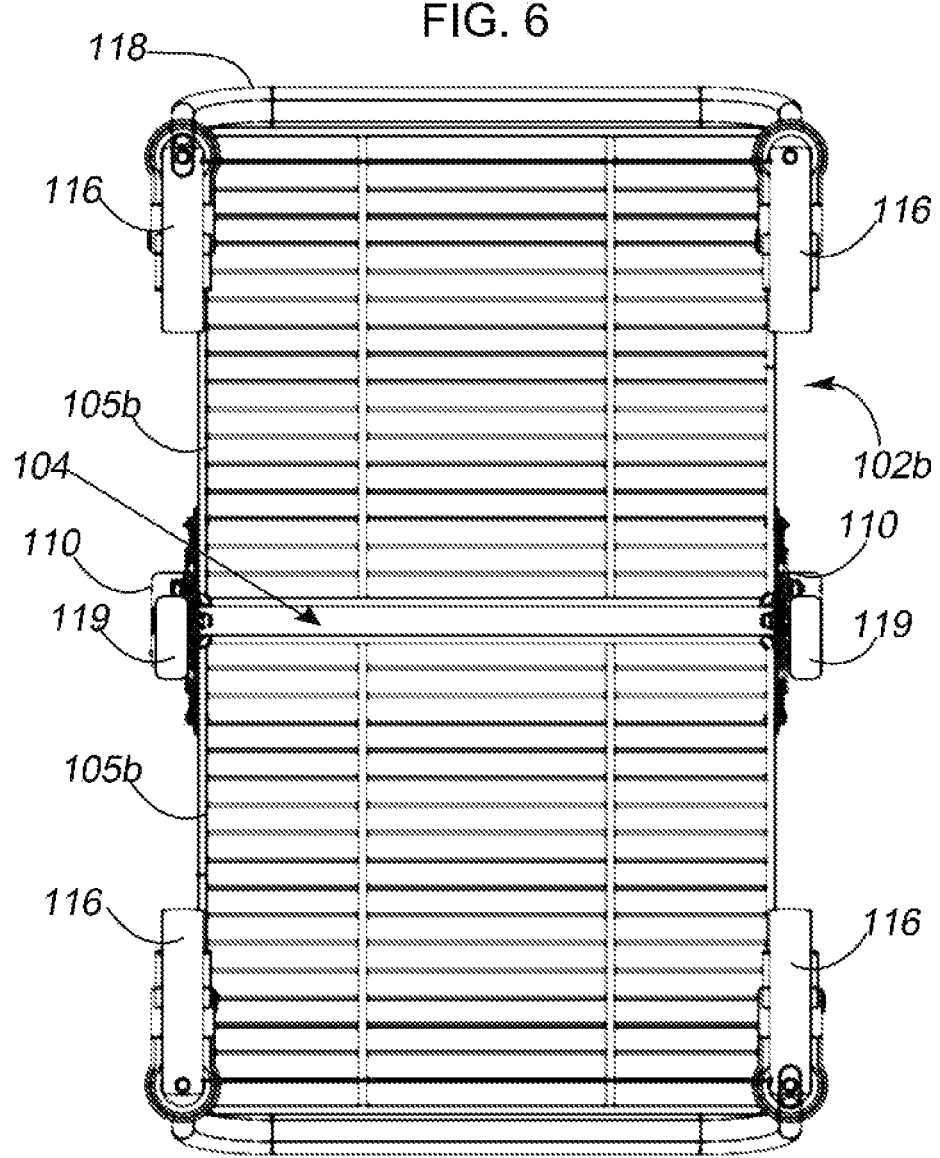
FIG. 6 is a bottom view of the implementation shown in (FIG. 1)

FIGS. 5 and 6 depict respectively, top and bottom views of the collapsible cart. While FIG. 6 shows a bottom side of the cart where the pivotable panels (105*b*) of the lower support member include a transverse gap 104 similar to the upper pivotable panels (105*a*), In some implementations, the bottom platform may have a smaller gap between the panels, or, the gap may be absent.

Figure 7A:
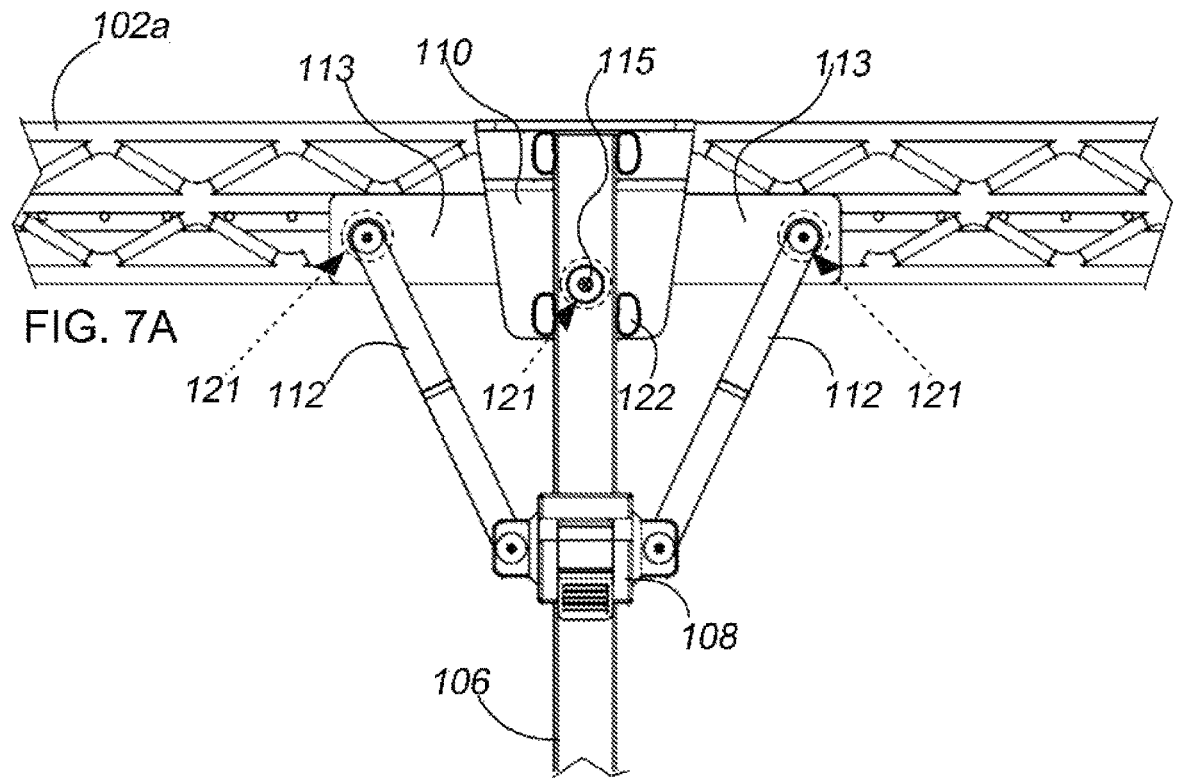
FIG. 7A is an enlarged partial view of a section of the implementation in (FIG. 3)

FIG. 7A is an enlarged partial view of the upper middle of the cart and includes the pivoting and locking elements: lift flange (110), pivotable plate(s) (113), struts (112), middle support (106) and slidable member (108) with latch (109). Also shown are locations for friction washers (121). Note that anywhere on the cart between mating parts where conventional washers might be used, friction washers may be substituted.

Figure 7B:
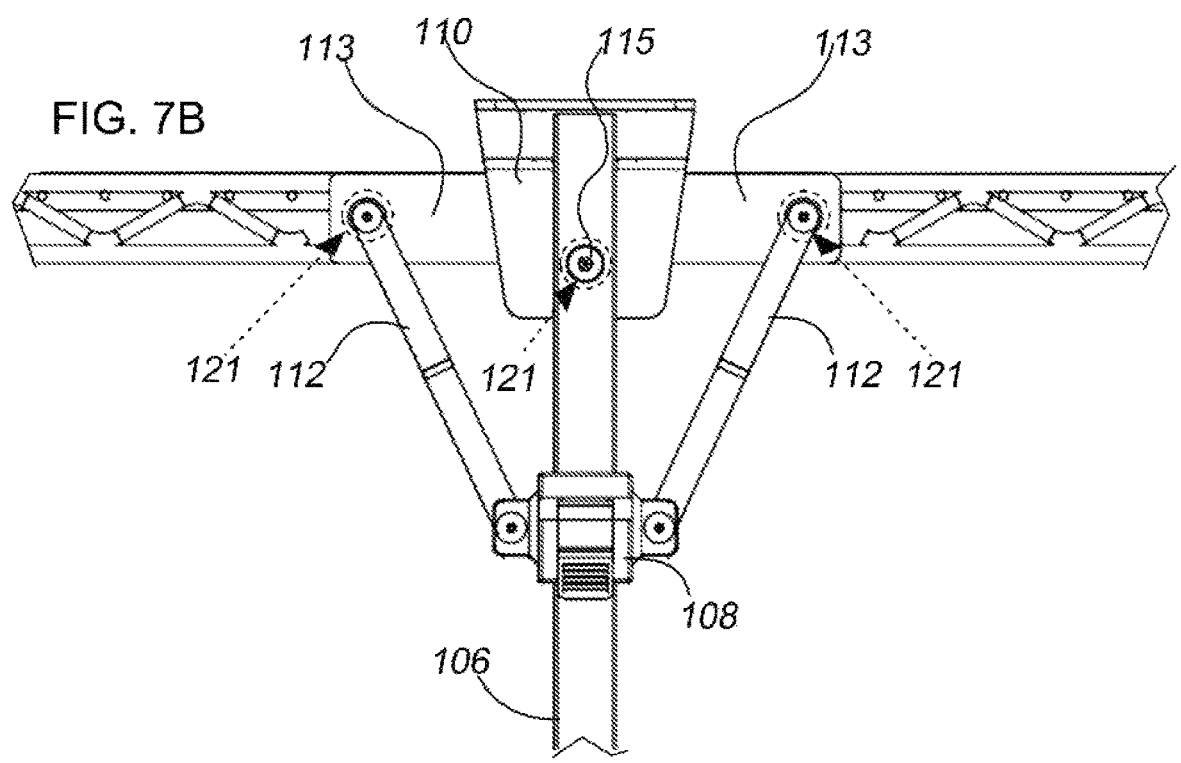
FIG. 7B is a second enlarged partial view of an implementation lacking a raised border (103)

FIG. 7B is an enlarged partial view similar to (FIG. 7A), except lacking top lip (103).

FIG. 7C shows the cart in a collapsed position. Note the transition of the pivoting and locking elements from the positions shown in (FIG. 7A). Unlocking slidable member (108) and lifting lift flanges (110) causes the pivotable panels of the upper support surface to break medially, being connected to struts (112) via pivotable plate(s) (113).

FIG. 8 is an enlarged perspective partial view that shows the relationship of the pivotable plates (113) to each other medially connected by pin (115) and wherein each plate is connected to a pivotable panel. Note the stop portions (s) of the plates that when abutting places the pivotable panels in a substantially planar disposition.

Figure 9:
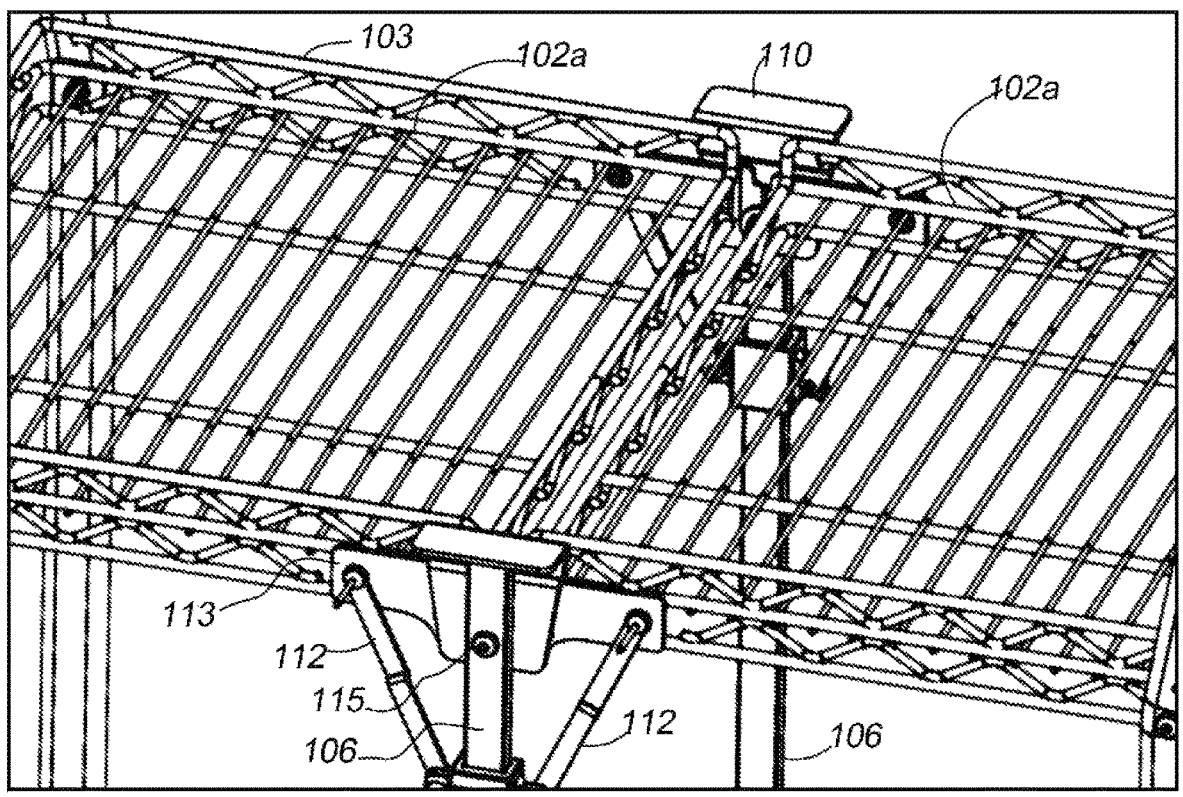
FIG. 9 is an enlarged partial view of an upper section of a collapsible cart in an uncollapsed state.

FIG. 9 is an enlarged perspective partial view showing the pivotable plates (113) and pivotable panels of the upper platform.

Figure 10A:
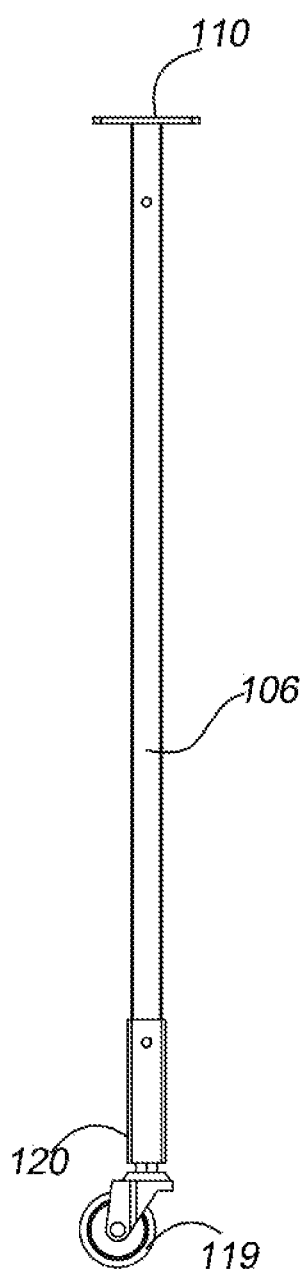
FIG. 10A is a side elevation of a middle caster assembly and support.
Figure 10B:
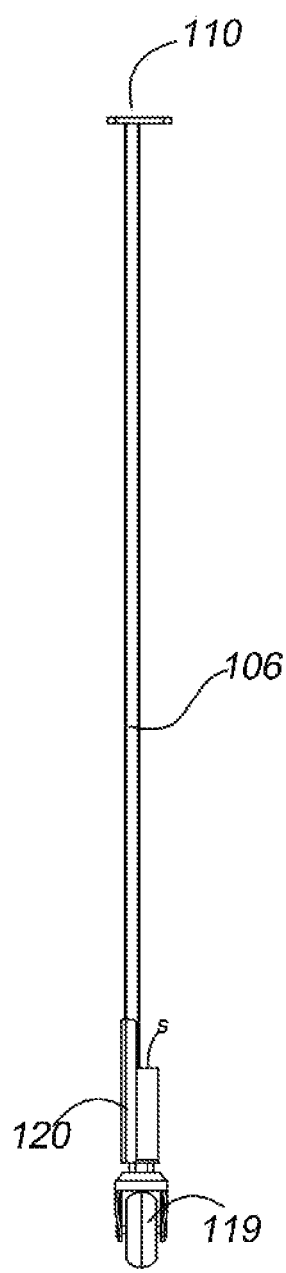
FIG. 10B is another side elevation of a middle caster assembly and support.
Figure 10C:
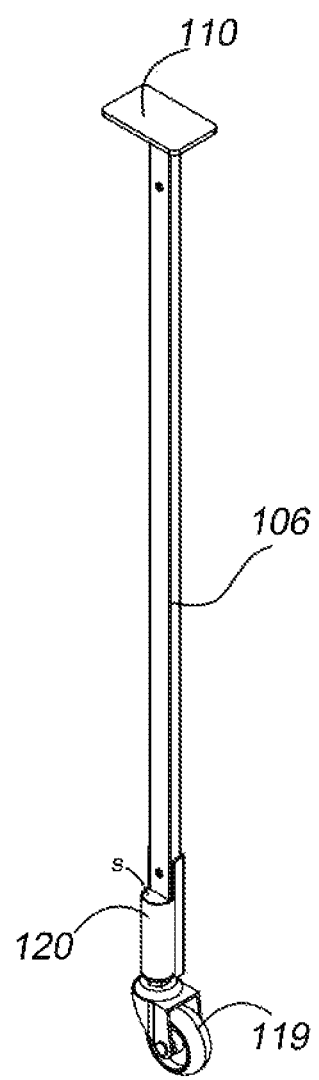
FIG. 10C is a perspective view of a middle caster assembly and support.

FIGS. 10A, 10B and 10C shows various views of a middle support and caster assembly.

Figure 11A:
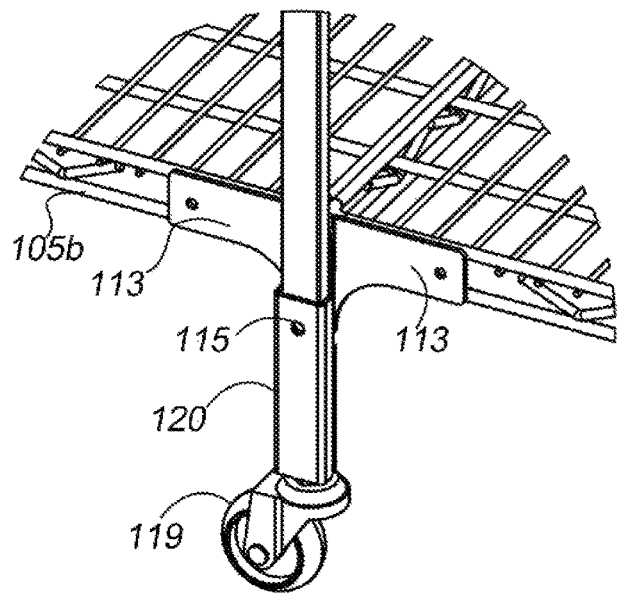
FIGS. 11A and 11B are partial views of a middle caster assembly mounted to a collapsible cart.
Figure 11B:
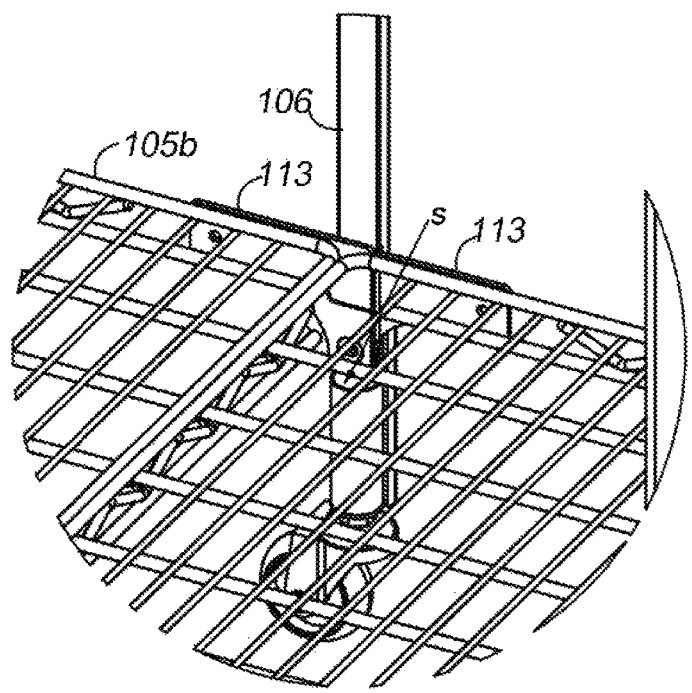

FIGS. 11A and 11B show respectively, left and right side middle casters.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A safety cart comprising:
   the cart includes a collapsed configuration and an uncollapsed configuration;
   a plurality of frame members;
   a first set of caster wheels, each wheel of the first set at a corner of the cart;
   at least one panel pair of adjacent panels, each panel of the adjacent panel pair is joined to a pivot plate, each pivot plate is pivotably connected to medial pivot member, and each medial pivot member is connected to a middle support member;
   a middle caster connected to an end of each middle support member; and
   the adjacent panels of the at least one panel pair includes a transverse gap of at least ⅝ inch between the adjacent panels and the adjacent panels are configured to pivotably form an inverted 'V' shape when the cart is in the collapsed configuration.

2. The safety cart according to claim 1, further comprising a sliding member mounted to the middle support member.

3. The safety cart according to claim 1, further comprising angularly displaceable struts connected to a sliding member and the pivot plates.

4. The safety cart according to claim 1, further comprising friction washers at pivot points.

5. The safety cart according to claim 1, further comprising a lock configured to secure the cart in the collapsed configuration or the uncollapsed configuration.

* * * * *